July 3, 1951  E. C. DE HART  2,559,348
ANIMAL TRAP
Filed July 11, 1945  2 Sheets-Sheet 1

INVENTOR.
E. C. DeHart
BY
ATTYS

July 3, 1951  E. C. DE HART  2,559,348
ANIMAL TRAP

Filed July 11, 1945  2 Sheets-Sheet 2

INVENTOR.
E. C. DeHart
BY
*Corbett Turbitt*
ATTYS

Patented July 3, 1951

2,559,348

UNITED STATES PATENT OFFICE 2,559,348

ANIMAL TRAP

Edward C. De Hart, Turlock, Calif.

Application July 11, 1945, Serial No. 604,426

2 Claims. (Cl. 43—90)

This invention relates to, and it is an object to provide, an improved animal trap of spring-urged jaw type; the present trap being especially suited for use to trap small animals, such as muskrats.

An additional object of this invention is to provide an animal trap wherein the jaws, when sprung, are positively locked against opening by the trapped animal, and further the trap is constructed so as to minimize the possibility of the animal gnawing off the trapped part, such as a foot, and thus escaping.

Another object of the invention is to provide an animal trap which is designed so that, when sprung by an animal, few misses occur; this being accomplished through the medium of a unique multiple jaw assembly comprising two cooperating pairs of complementary jaws, which pairs are mounted to spring at right angles to each other.

A further object of the invention is to produce a simple and inexpensive device and yet one which will be exceedingly effective for the purpose for which it is designed.

These objects are accomplished by means of such structure and relative arrangement of parts as will fully appear by a perusal of the following specification and claims.

In the drawings similar characters of reference indicate corresponding parts in the several views.

Figure 1:
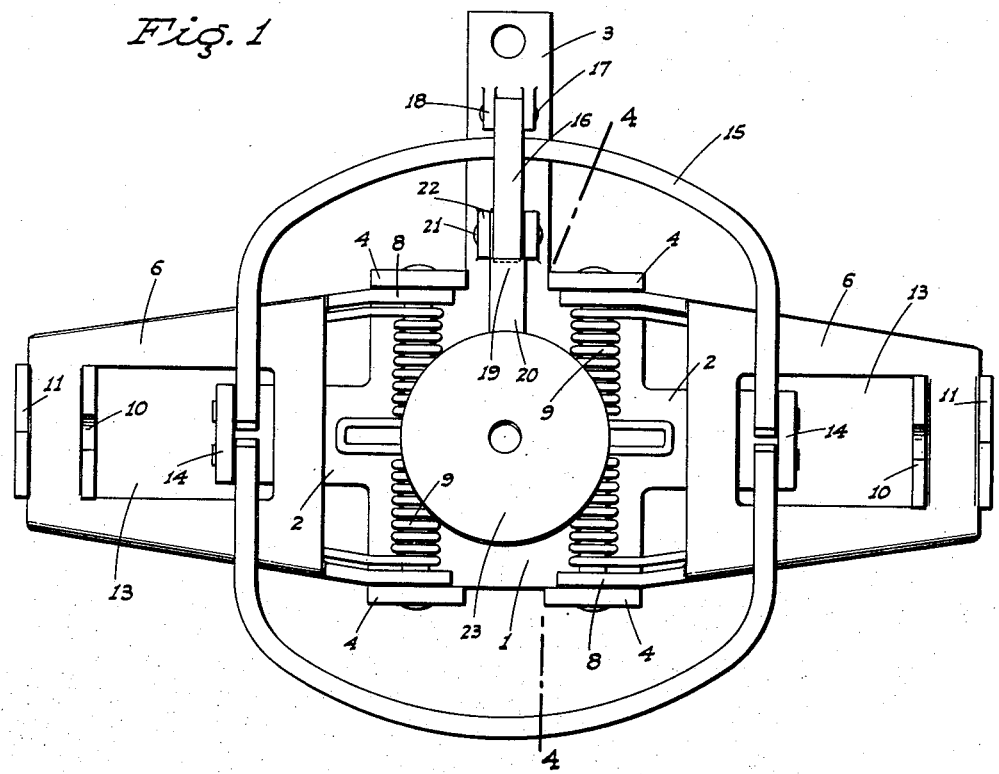
Figure 1 is a plan view of the trap in open or set position.

Referring now more particularly to the characters of reference on the drawings, the trap comprises a flat horizontal base 1 including a pair of flat opposed horizontal legs 2 which project from opposite ends of said base, and a similar leg 3 projecting laterally from one side of the base.

At opposite sides the base is formed with a pair of spaced upstanding ears 4, and opposed corresponding ones of said ears are connected by a cross pin 5.

A pair of plate-like jaws 6, formed with downturned side flanges 7 which extend beyond the inner ends of said jaws as attachment fingers 8, are pivoted by said fingers to the cross pins 5. The jaws 6 extend substantially horizontally outwardly when the trap is in the set position of Fig. 1, and are forcefully urged toward the upstanding cooperative or closed position, as shown in Fig. 2, by torque springs 9 extending about the pins 5 and including end legs which engage the base 1 and jaws 6, respectively.

Figure 2:
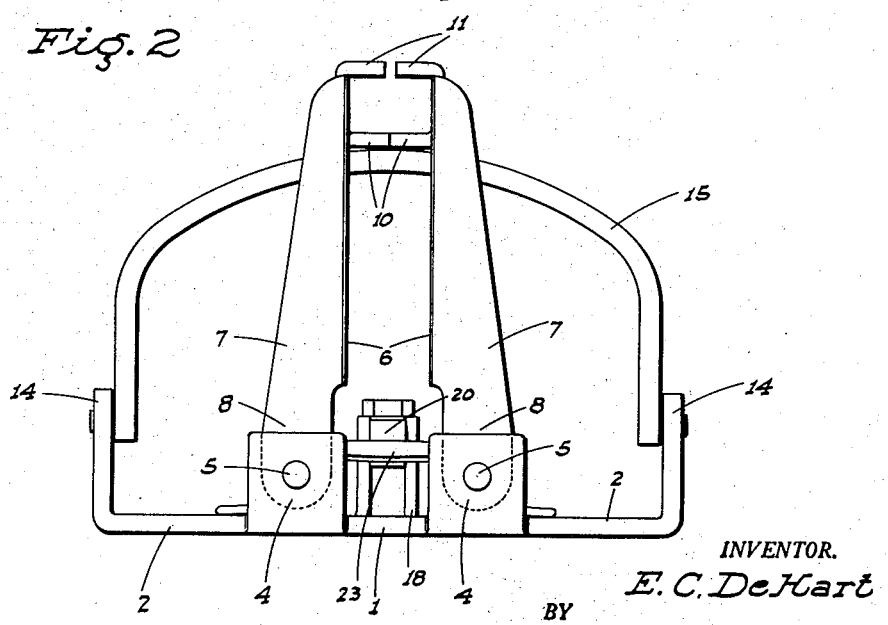
Figure 2 is a side elevation of the trap, sprung.

The outer end portions of the jaws 6 are formed with complementary inner grips 10 and outer grips 11 spaced lengthwise of said jaws and adapted to move into close proximity and complementary relation to each other when the jaws are in the closed position of Fig. 2.

Figure 3:
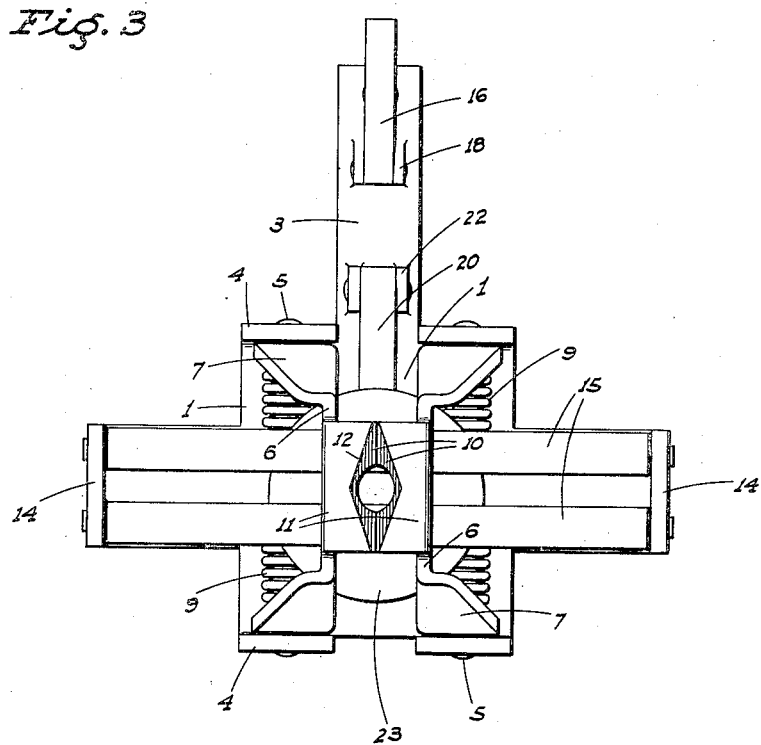
Figure 3 is a plan view of the trap, sprung.
Figure 4:
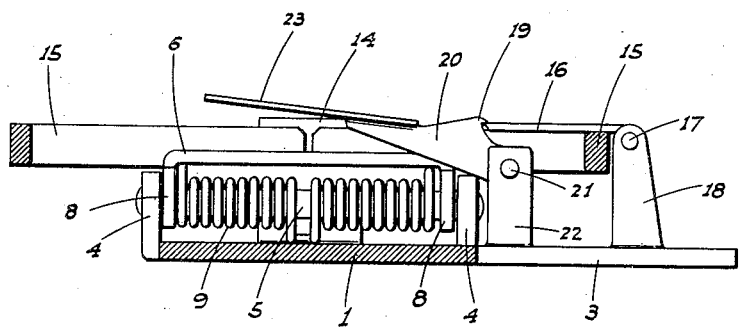
Figure 4 is a cross section on line 4—4 of Fig. 1.

The adjacent edges of the complementary grips 10 and 11 are V'd, as at 12, as shown in Fig. 3, whereby to effectively grasp the caught part of the animal.

Inwardly of the grips 10 the jaws 6 are longitudinally slotted, as at 13, said slots being of substantial width and extending inwardly to a point, when the jaws 6 are open, beyond the outer ends of the opposed legs 2 on the base 1. Said opposed legs 2 are formed, at their outer ends, with upturned ears 14 which project through the slots 13 when the jaws 6 are open. A pair of opposed bail-like jaws 15 are pivoted, at opposite ends, in connection with the ears 14 for vertical swinging movement, and said jaws 15, when opened in opposite directions and to a substantially horizontal position, overlie the jaws 6 in the manner shown in Fig. 1.

One of the jaws 15 is adapted to be releasably latched in open position by means of the following described mechanism, and for the purpose of maintaining the jaws 6 open against the torque of the springs 9.

This latching mechanism comprises a trigger 16 pivoted at one end, as at 17, on the upper end of an upstanding ear 18 mounted on the lateral leg adjacent its outer end. When the trap is set the trigger 16 extends in holding relation across the adjacent open jaw 15 and is latched in connection with a notched part 19 of a trigger release arm 20 pivoted, as at 21, on an upstanding ear 22 rigid with the leg 3. The trigger release arm 20 extends inwardly over the base 1 to substantially the center thereof, and is there fitted with an upwardly facing trigger plate 23 on which the bait for the animal is adapted to be placed. It will be seen that while the trigger 16 is engaged with the notched part 19 of the trigger release arm 20, the trap cannot close. However, upon an animal tripping the plate 23 downward the notched part 19 releases the trigger 16, whereupon the adjacent jaw 15 is freed for upward swinging movement. When this occurs the jaws 6 snap upwardly under the influence of the springs 9, and in turn said jaws 6 snap the jaws 15 upwardly; the latter swinging upwardly in one direction to substantially closed position, as shown in Fig. 3, and the jaws 6 swinging upwardly to closed position at right angles thereto. This is possible for the reason that as the jaws 15 reach their closed position, the jaws 6 can swing upwardly without restriction therefrom as said jaws 15 then pass relatively through the slots 13.

The trap thus has a unique multiple jaw arrangement with one pair of jaws working at right angles to the other pair. The part of the animal, as for example a leg, is effectively trapped between the complementary grips 10 and 11 of the jaws 6 and in an opposite direction is clamped between the jaws 15. By reason of the described jaw arrangement, few misses occur when the trap is sprung, and after the animal is trapped the possibility of it gnawing off the trapped part is minimized, for the reason that the outwardly projecting portions of the closed jaws 15, as well as the wide flanged jaw-plates 6, serve as a guard which prevents said animal gaining access to the trapped part between the jaws 6.

It will be noted that the leg of a small animal will be gripped at three points—the jaws 15 and the grips 10 and 11. However, a larger animal may also be effectively caught by the trap. In this case, the leg is initially gripped between jaws 15, even though the jaws 6 may be unable to fully close, by reason of the greater spread of jaws 15 had when gripping the larger leg. Also, the gripping faces of jaws 15 are substantially parallel when fully closed, giving a gripping action at any point in their length.

As shown, the width of openings or slots 13 is substantially wider than the combined width of jaws 15 so that even when said jaws 15 are moved to closed position by the closing of jaws 6, they may remain spaced an appreciable distance apart. Since jaws 15 reach their fully closed position long before jaws 6 reach their closed position, the spacing of jaws 15 leaves an elongated slot between jaws 6 through which the leg of a small animal may project without being actually clamped. As a result, such leg is guided by the upwardly sweeping jaws 6, without being torn or broken, into the central opening formed by grips 10 and 11.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent are desired:

1. An animal trap comprising a base, two pairs of jaws separately pivoted on the base, the jaws of one pair being provided with arcuate portions, means releasably engaging one jaw to hold all the jaws in set position, spring means to move all the jaws to closed position when the engaged jaw is released; the jaws of each pair being movable to a closed position at right angles to the jaws of the other pair, the other pair of jaws having plate-like apertured intermediate portions movable to closed position on the arcuate portion of the jaws of said one pair, the outer end portions of the jaws of said other pair being spaced from each other and above the jaws of said one pair when all the jaws are in closed position, and spaced cooperating pair of leg-gripping plates projecting toward each other from said outer end portions of the other pair of jaws.

2. An animal trap comprising a base, two pairs of opposed complementary jaws, means pivoting said jaws to the base for swinging movement between a substantially horizontal open position and an upstanding closed position, the directions of swinging movement of said pairs being at right angles to each other, spring means urging said pairs of jaws toward upstanding position, an animal operable, and releasable catch effective to maintain the jaws in open position, the jaws of one pair intersecting the jaws of the other pair when all the jaws are in upstanding closed position and the upper ends of one pair of jaws then lying on a higher plane than the upper ends of the other pair, said higher upper ends each being provided with a pair of longitudinally spaced complementary grips which lie above the upper ends of the lowermost pair of jaws when the jaws are in closed position.

EDWARD C. DE HART.

REFERENCES CITED

The following references are of record in the file of this patent:

UNITED STATES PATENTS

| Number | Name | Date |
| --- | --- | --- |
| 1,316,024 | Froelich | Sept. 16, 1919 |
| 1,495,096 | Murphy | May 20, 1924 |
| 2,247,632 | Graybill | July 1, 1941 |